(12) United States Patent
Xu et al.

(10) Patent No.: US 11,391,451 B2
(45) Date of Patent: Jul. 19, 2022

(54) LIGHTING APPARATUS

(71) Applicant: XIAMEN LEEDARSON LIGHTING CO., LTD, Fujian (CN)

(72) Inventors: Fengli Xu, Fujian (CN); Tiansong Lan, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 88 days.

(21) Appl. No.: 17/072,889

(22) Filed: Oct. 16, 2020

(65) Prior Publication Data
US 2021/0116110 A1 Apr. 22, 2021

(30) Foreign Application Priority Data

Oct. 16, 2019 (CN) .......................... 201921737435.9
Oct. 16, 2019 (CN) .......................... 201921737480.4
Oct. 16, 2019 (CN) .......................... 201921737548.9
Oct. 16, 2019 (CN) .......................... 201921737599.1

(51) Int. Cl.
*F21V 21/29* (2006.01)
*F21V 33/00* (2006.01)
*G06V 20/52* (2022.01)
*F21Y 115/10* (2016.01)

(52) U.S. Cl.
CPC .......... *F21V 21/29* (2013.01); *F21V 33/0056* (2013.01); *G06V 20/52* (2022.01); *F21Y 2115/10* (2016.08)

(58) Field of Classification Search
CPC .. F21V 21/29; F21V 33/0056; F21Y 2115/10; G06V 20/52
See application file for complete search history.

(56) References Cited

U.S. PATENT DOCUMENTS

2018/0321161 A1* 11/2018 Okada ....................... G06T 7/70
2020/0167905 A1*  5/2020 Bian ....................... B25J 9/1697
2020/0306000 A1* 10/2020 Okabe .................... A61B 90/20

* cited by examiner

*Primary Examiner* — Anne M Hines
(74) *Attorney, Agent, or Firm* — Chun-Ming Shih; Lanway IPR Services (57) ABSTRACT

In some embodiments, a lighting apparatus includes a driver module, a base platform, a camera module, a first light source and a second light source. The driver module is electrically connected to an external power source. The base platform has multiple slots. The driver module is enclosed by the base platform. The camera module is fixed to a first slot of the slots via a camera rotatable arm. The first light source is fixed to a second slot of the slots via a first rotatable arm. The second light source is fixed to a third slot of the slots via a second rotatable arm.

20 Claims, 8 Drawing Sheets

LIGHTING APPARATUS

FIELD

The present invention is related to a lighting apparatus, and more particularly related to a lighting apparatus with multiple functions.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

People expect to add more functions on lighting devices. For example, sensors, speakers or camera modules are interesting devices to make lighting devices more convenient. It is also important to find an innovative way to integrated multiple devices so as to easily install or configure such devices.

SUMMARY

In some embodiments, a lighting apparatus includes a driver module, a base platform, a camera module, a first light source and a second light source.

The driver module is electrically connected to an external power source.

The base platform has multiple slots.

The driver module is enclosed by the base platform.

The camera module is fixed to a first slot of the slots via a camera rotatable arm.

The first light source is fixed to a second slot of the slots via a first rotatable arm.

In some embodiments, the first source and the second light source are two spot light modules for emitting two light beams. The first light source, the second light source and the camera are disposed symmetrically. In some embodiments, there is only one light source, instead of two light sources. In some other embodiments, there are more than two light sources.

In some embodiments, the base platform has a shape of a round disk. There is a container space in the round disk for containing a driver circuit connecting to an external power source, e.g. 110V/220V alternating current power. The driver circuit converts the external power to a driving current to the first light source and the second light source.

In some embodiments, the first light source, the second light source and the camera module share the same set of driver circuit. In some other embodiments, the driver module contains a driver which is co-working with the driver circuit in the round disk.

In some embodiments, the first light source and the second light source also have their own driver circuits. The first light source, the second light source and the camera module may be detachably removed from the base platform to be replaced with other modules or other combination. In such case, the base platform provides a structural and electrically connection for the first light source, the second light source and the camera module.

The second light source is fixed to a third slot of the slots via a second rotatable arm.

The rotatable arms of the first light source and the second light source may have multiple rotation angles so as to change light directions of the first light source and the second light source.

The camera module is fixed to the base platform with the camera rotatable arm. the camera rotatable arm may be manually moved to change an angle of the camera module faces to. More than two rotation directions may be provided to the camera rotatable arm for providing a larger flexibility of the moving the camera module.

In some embodiments, the first light source emits a light beam while the second light source emits a diffusing light. This is particularly helpful when the first light source helps the camera module to get a clearer image, while the second light source provides a basic illumination of the ambient environment.

In some embodiments, the driver module controls the first light source and the second light source to a camera mode while the driver module receives a camera command to take pictures with the camera module.

For example, a server, a remote control or a mobile phone may send a camera command via a wire or wireless channel to the driver in the base platform or a control circuit integrated with the camera module. When the camera command is received, it is parsed and decoded. A corresponding operation is executed, e.g. to take an image or a video, to the camera module. In some embodiments, the driver also adjusts output of the first light source and/or the second light source to co-work with the camera module.

For example, the first light source is moved to emit light to the direction of the camera module. A special light pattern, intensity, color, or color temperature may be mixed by the first light source and the second light source to get a required effect on using the camera module.

The first light source and the second light source are controlled differently between the camera mode and a normal illumination mode.

In some embodiments, the camera command is mixed with a parameter generated by the camera module. For example, the camera module may have a sensor to detect whether there is sufficient light to take a picture. When the detected ambient light is not sufficient, the camera module may mix a parameter to the camera command. The driver of the lighting apparatus extracts the parameter and controls the first light source and the second light source corresponding to the parameter.

In some embodiments, the camera command includes a required color temperature to be mixed by the first light source and the second light source.

In some embodiments, the first light source and the second light source are temporarily turned off when a shutter of the camera module is turned on to shot images. Specifically, a camera module may have a shutter to open when capturing images. Usually, a static image capture only needs a short timing for opening the shutter. When the shutter is open, the first light source and the second light source may be turned off temporarily to prevent affecting the image capturing of the camera module. Meanwhile, the timing is short and thus, people may not feel the difference while taking the images.

Instead of turning off the first light source and the second light source, other operations, e.g. turning on an infrared light of the first light source or enhancing a blue light of the second light source may be adopted when taking an image by the camera module.

In some embodiments, the second light source is detachable to be replaced with another type of light source.

In some embodiments, the second light source is detachable to be replaced with a second camera module.

In some embodiments, the base platform is rotatable. Therefore, in addition to the rotatable arm, the camera module has a larger movement options by rotating the base platform.

In some embodiments, the camera module is attached with a third light source. The third light source may provide a light to improve image capturing of the camera module. Meanwhile, the third light source may also be used for providing ambient illumination or mixing light with the first lights source and the second light source.

In some embodiments, the camera module detects whether there is a user existed in an area. A processor may execute an deep learning algorithms as those known by persons skilled in the art and extracts whether there is any person staying in an area covered by the camera module.

In some embodiments, the camera module identifies a user identity and the driver module controls the first light source and the second light source according to the user identity. For example, John and Mary may appear in the house. When John is recognized, the driver adjusts the control setting based on favorite settings corresponding to John. While Mary is identified, another settings may be used automatically.

In some embodiments, the user identity is passed to another lighting device to co-work with the lighting apparatus. Some adjacent light devices may not have a camera module, but the light devices may communicate with the lighting apparatus to get information to adjust settings based on user identity.

In some embodiments, the driver module controls said another lighting device. Specifically, the driver further controls other light devices as a control hub.

In some embodiments, the base platform has a stop structure for limiting a rotation angle of the base platform.

In some embodiments, the driver module transmits a recorded video stream to an external device via a wireless protocol.

In some embodiments, a rotation parameter of the camera rotatable arm is mixed to the recorded video stream to the external device. The rotation parameter helps an external device or a server to determine events based on locations. By calculating the rotation angles, the direction for the camera is facing is found and thus, the processed result, e.g. some abnormal object, may be identified and a more accurate message may be generated to inform users.

In some embodiments, when an abnormal case is detected from the recorded video stream.

The control module automatically generates an alarm message.

In some embodiments, the alarm message is an alarm sound from a speaker attached to the base platform.

In some embodiments, the camera rotatable arm has a mobile phone holder for holding a mobile phone to work as the camera module. Many people have old mobile phones, which are suitable to use as a camera module. The camera rotatable arm may have a mobile phone holder to provide electricity and structural support. With such design, the cost of the camera module may be saved.

DETAILED DESCRIPTION

Figure 9:
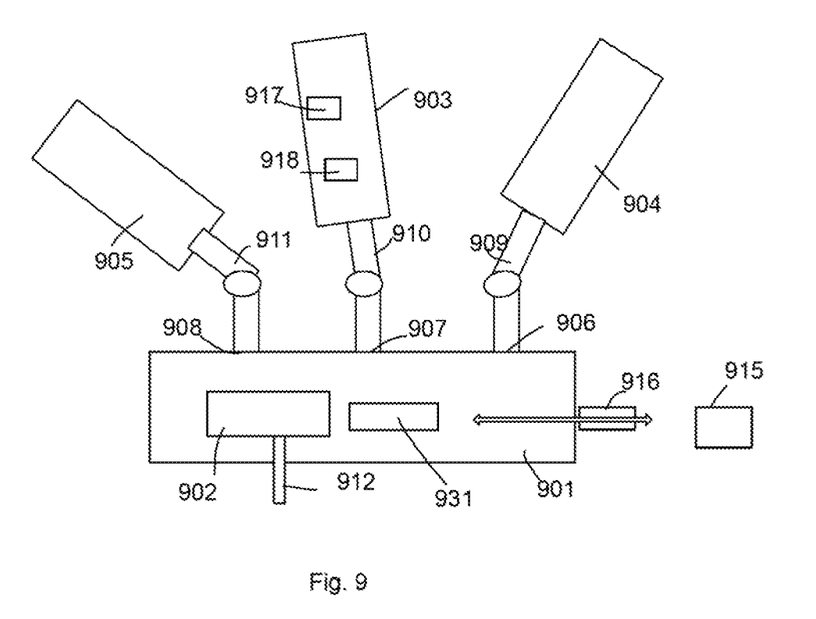
FIG. 9 shows a lighting apparatus embodiment.

In FIG. 9, a lighting apparatus includes a driver module 902, a base platform 901, a camera module 903, a first light source 904 and a second light source 905.

The driver module 902 is electrically connected to an external power source 912.

The base platform has multiple slots.

The driver module 902 is enclosed by the base platform 901.

The camera module 903 is fixed to a first slot 907 of the slots via a camera rotatable arm 910.

The first light source 904 is fixed to a second slot 906 of the slots via a first rotatable arm 909.

In some embodiments, the first source 904 and the second light source 905 are two spot light modules for emitting two light beams. The first light source, the second light source and the camera are disposed symmetrically. In some embodiments, there is only one light source, instead of two light sources. In some other embodiments, there are more than two light sources.

In some embodiments, the base platform has a shape of a round disk. There is a container space in the round disk for containing a driver circuit connecting to an external power source, e.g. 110V/220V alternating current power. The driver circuit converts the external power to a driving current to the first light source and the second light source.

In some embodiments, the first light source, the second light source and the camera module share the same set of driver circuit. In some other embodiments, the driver module contains a driver which is co-working with the driver circuit in the round disk.

In some embodiments, the first light source and the second light source also have their own driver circuits. The first light source, the second light source and the camera module may be detachably removed from the base platform to be replaced with other modules or other combination. In such case, the base platform provides a structural and electrically connection for the first light source, the second light source and the camera module.

The second light source 905 is fixed to a third slot 908 of the slots via a second rotatable arm 911.

The rotatable arms of the first light source and the second light source may have multiple rotation angles so as to change light directions of the first light source and the second light source.

The camera module is fixed to the base platform with the camera rotatable arm. the camera rotatable arm may be manually moved to change an angle of the camera module faces to. More than two rotation directions may be provided to the camera rotatable arm for providing a larger flexibility of the moving the camera module.

In some embodiments, the first light source emits a light beam while the second light source emits a diffusing light. This is particularly helpful when the first light source helps the camera module to get a clearer image, while the second light source provides a basic illumination of the ambient environment.

In some embodiments, the driver module controls the first light source and the second light source to a camera mode while the driver module receives a camera command 916 from an external device 915 to take pictures with the camera module 903.

For example, a server, a remote control or a mobile phone may send a camera command via a wire or wireless channel to the driver in the base platform or a control circuit integrated with the camera module. When the camera command is received, it is parsed and decoded. A corresponding operation is executed, e.g. to take an image or a video, to the camera module. In some embodiments, the driver also adjusts output of the first light source and/or the second light source to co-work with the camera module.

For example, the first light source is moved to emit light to the direction of the camera module. A special light pattern, intensity, color, or color temperature may be mixed by the first light source and the second light source to get a required effect on using the camera module.

The first light source and the second light source are controlled differently between the camera mode and a normal illumination mode.

In some embodiments, the camera command is mixed with a parameter 918 generated by the camera module 903. For example, the camera module may have a sensor 917 to detect whether there is sufficient light to take a picture. When the detected ambient light is not sufficient, the camera module may mix a parameter to the camera command. The driver of the lighting apparatus extracts the parameter and controls the first light source and the second light source corresponding to the parameter.

In some embodiments, the camera command includes a required color temperature to be mixed by the first light source and the second light source.

In some embodiments, the first light source and the second light source are temporarily turned off when a shutter of the camera module is turned on to shot images. Specifically, a camera module may have a shutter to open when capturing images. Usually, a static image capture only needs a short timing for opening the shutter. When the shutter is open, the first light source and the second light source may be turned off temporarily to prevent affecting the image capturing of the camera module. Meanwhile, the timing is short and thus, people may not feel the difference while taking the images.

Instead of turning off the first light source and the second light source, other operations, e.g. turning on an infrared light of the first light source or enhancing a blue light of the second light source may be adopted when taking an image by the camera module.

In some embodiments, the second light source is detachable to be replaced with another type of light source.

In some embodiments, the second light source is detachable to be replaced with a second camera module.

In some embodiments, the base platform is rotatable. Therefore, in addition to the rotatable arm, the camera module has a larger movement options by rotating the base platform.

In some embodiments, the camera module is attached with a third light source. The third light source may provide a light to improve image capturing of the camera module.

Meanwhile, the third light source may also be used for providing ambient illumination or mixing light with the first lights source and the second light source.

In some embodiments, the camera module detects whether there is a user existed in an area. A processor may execute a deep learning algorithms as those known by persons skilled in the art and extracts whether there is any person staying in an area covered by the camera module.

In some embodiments, the camera module identifies a user identity and the driver module controls the first light source and the second light source according to the user identity. For example, John and Mary may appear in the house. When John is recognized, the driver adjusts the control setting based on favorite settings corresponding to John. While Mary is identified, another setting may be used automatically.

In some embodiments, the user identity is passed to another lighting device to co-work with the lighting apparatus. Some adjacent light devices may not have a camera module, but the light devices may communicate with the lighting apparatus to get information to adjust settings based on user identity.

In some embodiments, the driver module controls said another lighting device. Specifically, the driver further controls other light devices as a control hub.

In some embodiments, the base platform has a stop structure for limiting a rotation angle of the base platform.

In some embodiments, the driver module transmits a recorded video stream to an external device via a wireless protocol.

In some embodiments, a rotation parameter of the camera rotatable arm is mixed to the recorded video stream to the external device. The rotation parameter helps an external device or a server to determine events based on locations. By calculating the rotation angles, the direction for the camera is facing is found and thus, the processed result, e.g. some abnormal object, may be identified and a more accurate message may be generated to inform users.

In some embodiments, when an abnormal case is detected from the recorded video stream.

The control module automatically generates an alarm message.

In some embodiments, the alarm message is an alarm sound from a speaker 931 attached to the base platform.

Figure 10:
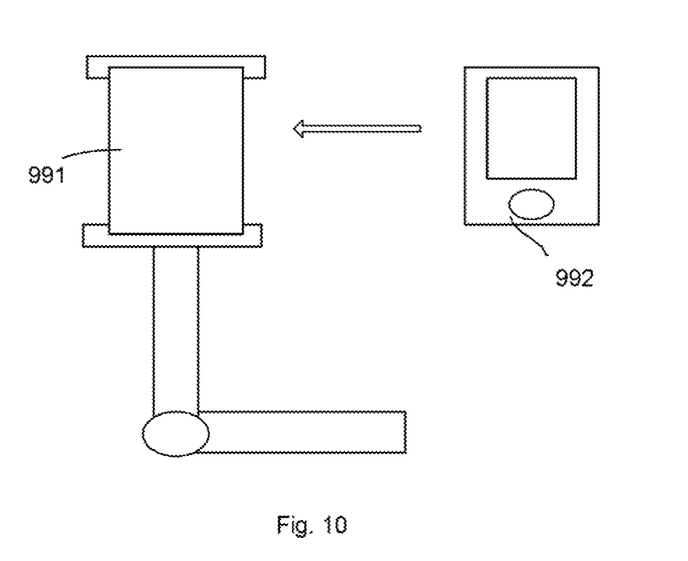
FIG. 10 shows a mobile phone holder to be an option for the camera module.

In FIG. 10, the camera rotatable arm has a mobile phone holder 991 for holding a mobile phone 992 to work as the camera module. Many people have old mobile phones, which are suitable to use as a camera module. The camera rotatable arm may have a mobile phone holder to provide electricity and structural support. With such design, the cost of the camera module may be saved.

Figure 1:
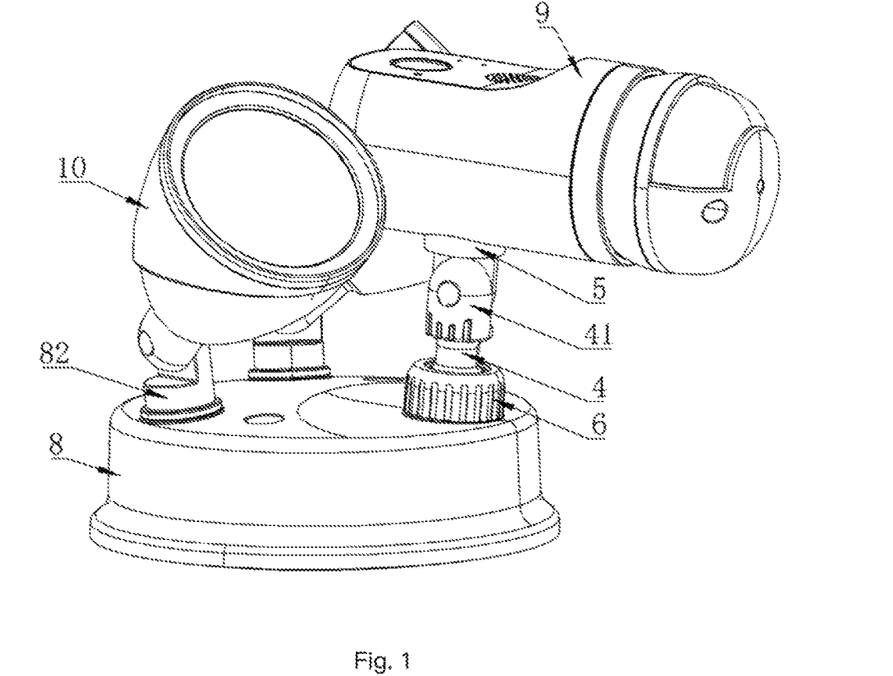
FIG. 1 illustrates an embodiment of a lighting apparatus with a camera module.

Please refer to FIG. 1, which shows an embodiment. In FIG. 1, the lighting apparatus has a camera module 9 and a light source 10. The camera module 9 is connected to the base platform 8 via a rotatable arm made of a connector 5, a first overlapping part 41, a movement part 4 and a lock sleeve 6. The light source 10 is connected to the base platform 8 via a rotatable arm 82.

Figure 2:
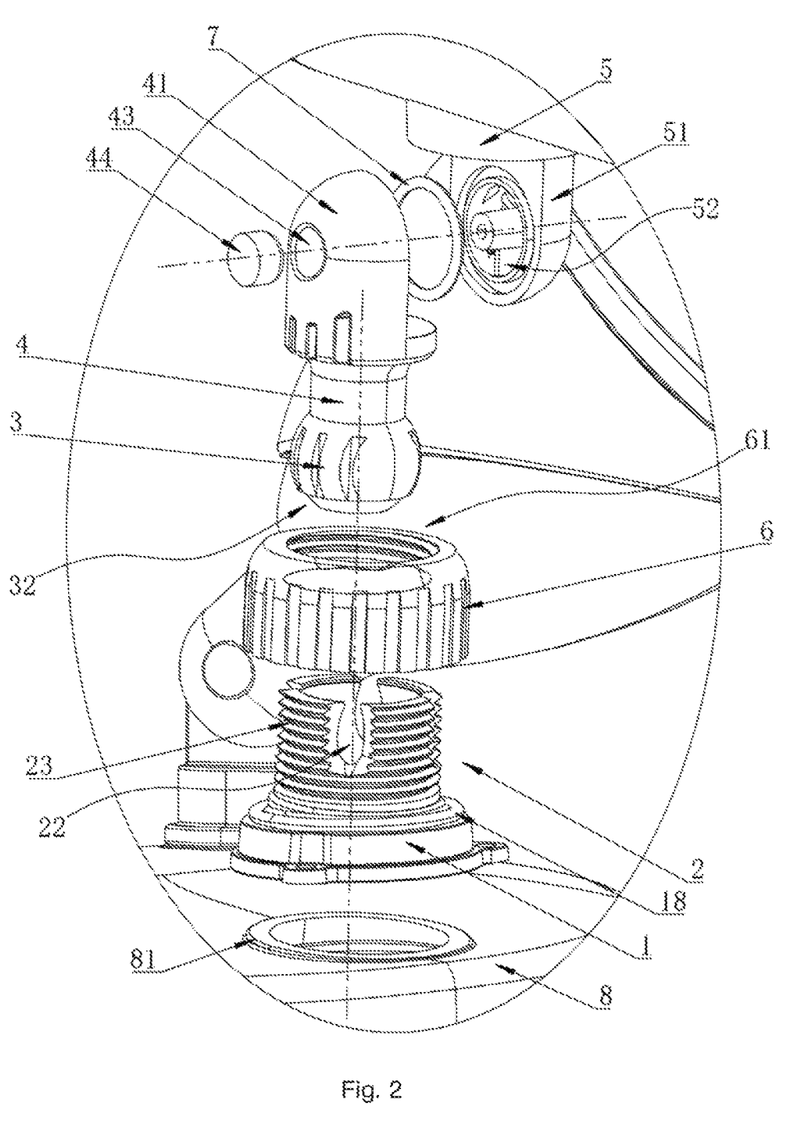
FIG. 2 illustrates an exploded view of components in the example of FIG. 1.

Please refer to FIG. 2, which shows the example in FIG. 1 in more details. The same reference numerals refer to the same components and are not repeated for brevity, the same in other disclosure below.

The connector 5 has a second overlapping part 51, which has a second connector part 52. The second connector part 52 is connected to the first overlapping part 41 with an intermediate sealing ring 7 therebetween.

There is a groove 43 for covering with a sealing cover 44. The movement part 4 is connected to a ball head 3 with an escape part 32. The ball head 3 is placed into a shrinking part 23 with cut groove 22 that is fastened by a lock sleeve 6 via a shrinking opening 61. The ball sleeve unit 2 may also has a sealing ring 18 connecting to a base connector 1 on the base platform 8. There is a base installation 81 for receiving the ball sleeve unit 2.

Figure 3:
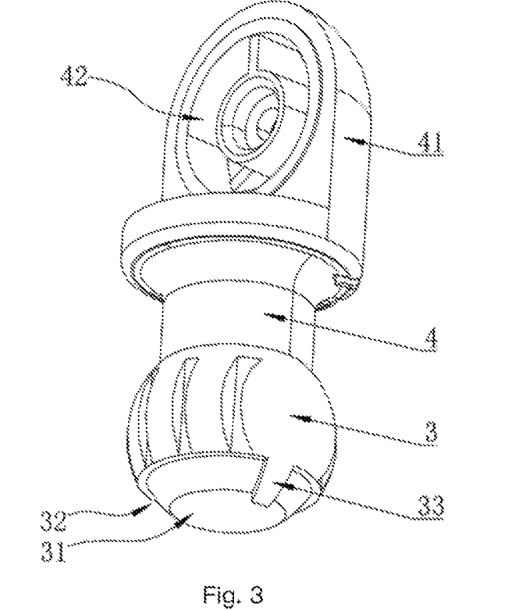
FIG. 3 illustrates a part of a camera arm example.

FIG. 3 shows a zoom-up view of the component illustrated in FIG. 2. In FIG. 3, there is a limiting block 33 for limiting rotation to prevent damage of twisted wires stored in the rotatable arm. There is a second opening for allowing the wires to pass through connecting to the module, a light source or a camera module. The second facing opening 42 is facing to another corresponding component shown in FIG. 2.

Figure 4:
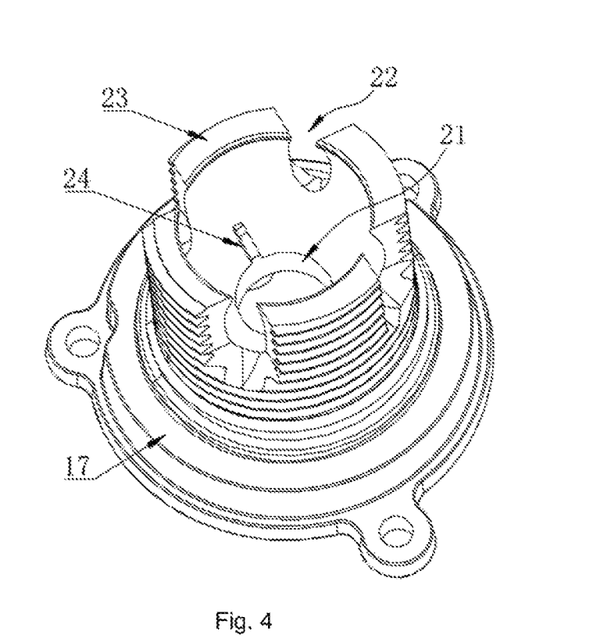
FIG. 4 illustrates a component of a camera arm example.

FIG. 4 further shows the component in previous drawings. In FIG. 4, there is a second limiting block 24 co-working with the limiting block 33 in previous drawings. There is a pressing part 17 and an opening for connecting to the driver module.

Figure 5:
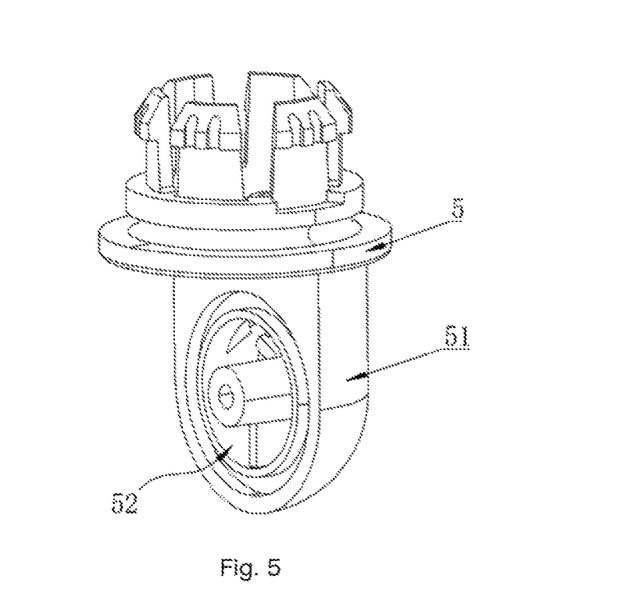
FIG. 5 illustrates another component of a camera arm example.

FIG. 5 shows the connector 5 mentioned above.

Figure 6:
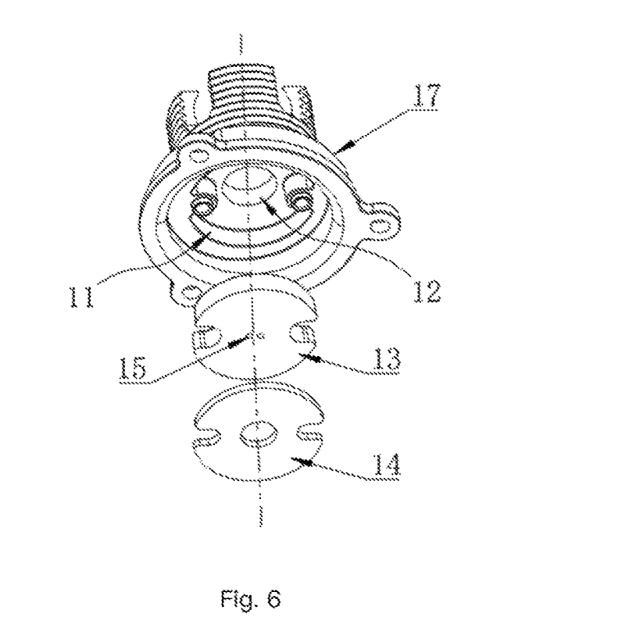
FIG. 6 illustrates another component of a camera arm example.

FIG. 6 shows that the pressing part 17 may further has a third opening 12, a through hole 11 and a wire passing hole 15 on a sealing pad 13, and a pressing plate 14.

Figure 7:
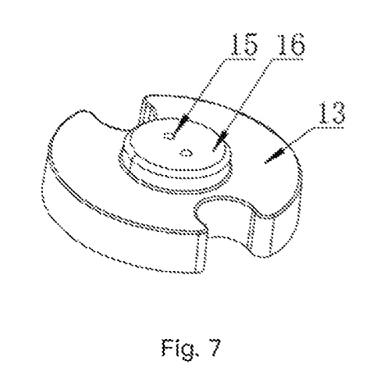
FIG. 7 illustrates a component example.

FIG. 7 shows there is a sealing unit 16 on the sealing pad 13 with a wire passing hole 15.

Figure 8:
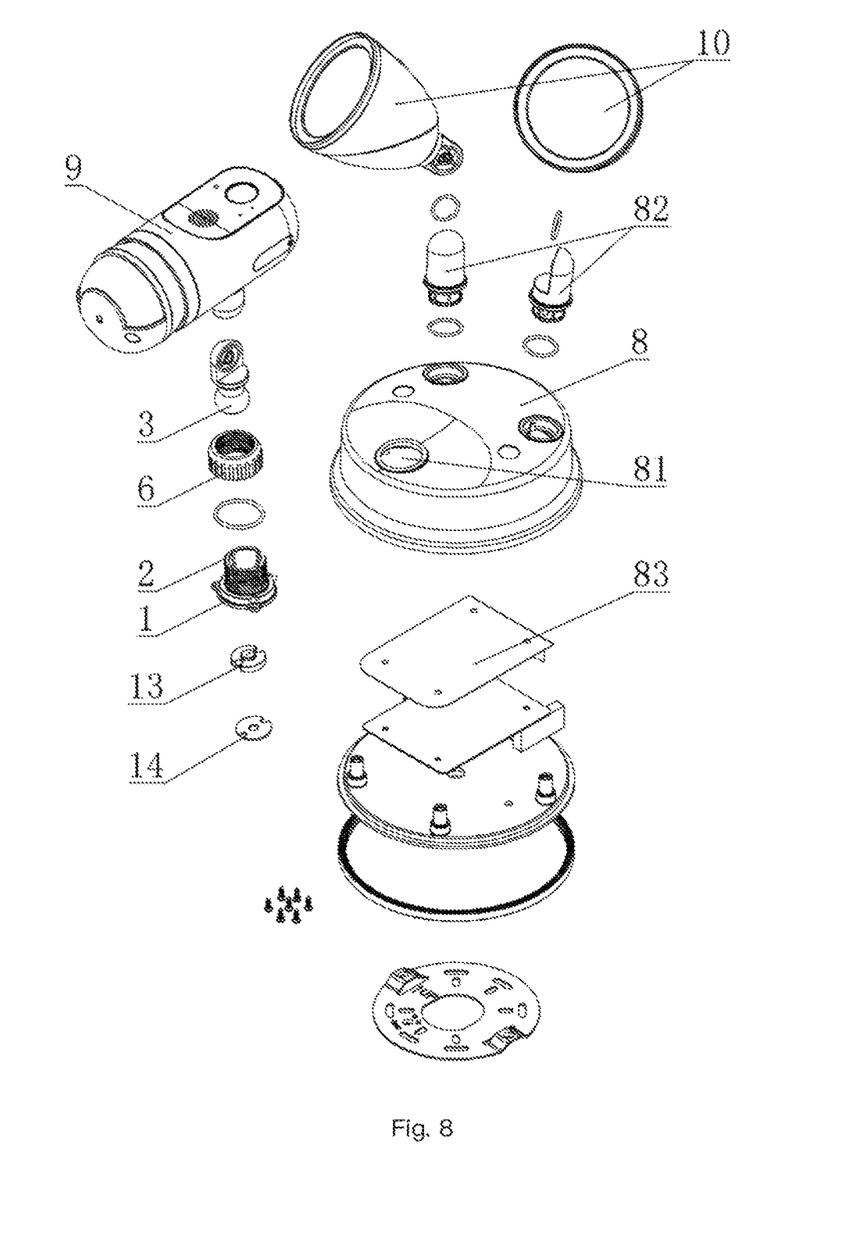
FIG. 8 illustrates an exploded view of an example.

FIG. 8 shows an exploded view of the embodiment. The light source 10 is connected with a rotatable arm 82 to the base platform 8. There are slots 81 on the base platform 8. There is a driver module 83, e.g. a driver circuit board with corresponding circuits.

In FIG. 8, the camera module is also illustrated in more details. The same reference numerals mentioned above are not repeated again for brevity.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
   a driver module for electrically connected to an external power source;
   a base platform having multiple slots, wherein the driver module is enclosed by the base platform;
   a camera module fixed to a first slot of the slots via a camera rotatable arm;
   a first light source fixed to a second slot of the slots via a first rotatable arm; and
   a second light source fixed to a third slot of the slots via a second rotatable arm.

2. The lighting apparatus of claim 1, wherein the first light source emits a light beam while the second light source emits a diffusing light.

3. The lighting apparatus of claim 1, wherein the driver module controls the first light source and the second light source to a camera mode while the driver module receives a camera command to take pictures with the camera module, the first light source and the second light source are controlled differently between the camera mode and a normal illumination mode.

4. The lighting apparatus of claim 3, wherein the camera command is mixed with a parameter generated by the camera module.

5. The lighting apparatus of claim 4, wherein the camera command includes a required color temperature to be mixed by the first light source and the second light source.

6. The lighting apparatus of claim 4, wherein the first light source and the second light source are temporarily turned off when a shutter of the camera module is turned on to shot images.

7. The lighting apparatus of claim 1, wherein the second light source is detachable to be replaced with another type of light source.

8. The lighting apparatus of claim 1, wherein the second light source is detachable to be replaced with a second camera module.

9. The lighting apparatus of claim 1, wherein the base platform is rotatable.

10. The lighting apparatus of claim 1, wherein the camera module is attached with a third light source.

11. The lighting apparatus of claim 1, wherein the camera module detects whether there is a user existed in an area.

12. The lighting apparatus of claim 11, wherein the camera module identifies a user identity and the driver module controls the first light source and the second light source according to the user identity.

13. The lighting apparatus of claim 11, wherein the user identity is passed to another lighting device to co-work with the lighting apparatus.

14. The lighting apparatus of claim 13, wherein the driver module controls said another lighting device.

15. The lighting apparatus of claim 1, wherein the base platform has a stop structure for limiting a rotation angle of the base platform.

16. The lighting apparatus of claim 1, wherein the driver module transmits a recorded video stream to an external device via a wireless protocol.

17. The lighting apparatus of claim 16, wherein a rotation parameter of the camera rotatable arm is mixed to the recorded video stream to the external device.

18. The lighting apparatus of claim 16, wherein when an abnormal case is detected from the recorded video stream, the control module automatically generates an alarm message.

19. The lighting apparatus of claim 18, wherein the alarm message is an alarm sound from a speaker attached to the base platform.

20. The lighting apparatus of claim 1, wherein the camera rotatable arm has a mobile phone holder for holding a mobile phone to work as the camera module.

* * * * *